(12) United States Patent
Greenlee et al.

(10) Patent No.: US 7,932,829 B2
(45) Date of Patent: *Apr. 26, 2011

(54) METHOD AND APPARATUS FOR SELF-EXPIRATION OF A PASSIVE DATA TAG DEVICE

(75) Inventors: Kenneth L. Greenlee, Raleigh, NC (US); Christian L. Hunt, Cary, NC (US); Steven M. Miller, Cary, NC (US); Anne I. Ryan, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 239 days.

This patent is subject to a terminal disclaimer.

(21) Appl. No.: 12/133,664

(22) Filed: Jun. 5, 2008

(65) Prior Publication Data

US 2009/0303049 A1 Dec. 10, 2009

(51) Int. Cl.
*G08B 134/14* (2006.01)
*G04F 8/00* (2006.01)
*G04F 10/00* (2006.01)

(52) U.S. Cl. ..................... 340/572.3; 368/107
(58) Field of Classification Search .... 340/568.1–572.9, 340/309.16, 309.3, 309.7, 309.9, 10.1–10.6; 368/89, 107–109

See application file for complete search history.

(56) References Cited

U.S. PATENT DOCUMENTS

| | | | | |
|---|---|---|---|---|
| 5,573,611 A | | 11/1996 | Koch et al. | |
| 6,025,780 A | * | 2/2000 | Bowers et al. | 340/572.3 |
| 6,741,523 B1 | * | 5/2004 | Bommarito et al. | 368/327 |
| 7,161,476 B2 | * | 1/2007 | Hardman et al. | 340/442 |
| 7,212,955 B2 | * | 5/2007 | Kirshenbaum et al. | 702/187 |
| 7,321,307 B1 | * | 1/2008 | Tow et al. | 340/572.3 |
| 7,345,586 B2 | * | 3/2008 | Black et al. | 340/572.3 |
| 7,375,635 B2 | | 5/2008 | Kessler et al. | |
| 7,411,503 B2 | * | 8/2008 | Stewart et al. | 340/572.1 |
| 7,548,164 B2 | * | 6/2009 | Guez et al. | 340/572.3 |
| 2005/0116826 A1 | * | 6/2005 | Wertsebrger | 340/572.3 |
| 2005/0127157 A1 | | 6/2005 | Stemmle et al. | |
| 2006/0187046 A1 | * | 8/2006 | Kramer | 340/572.3 |
| 2007/0018832 A1 | * | 1/2007 | Beigel et al. | 340/572.7 |
| 2008/0084309 A1 | * | 4/2008 | Posamentier | 340/572.7 |
| 2008/0117050 A1 | | 5/2008 | Wu et al. | |
| 2008/0157974 A1 | * | 7/2008 | Boss et al. | 340/572.3 |
| 2009/0040878 A1 | * | 2/2009 | Domes et al. | 368/107 |
| 2009/0276790 A1 | | 11/2009 | Greenlee et al. | |
| 2009/0303017 A1 | | 12/2009 | Greenlee et al. | |
| 2009/0303020 A1 | | 12/2009 | Greenlee et al. | |
| 2009/0303061 A1 | | 12/2009 | Greenlee et al. | |

OTHER PUBLICATIONS

"Problems With RFID", Technovelgy, LLC, viewed Feb. 5, 2008.
Karjoth, G., et al., "Disabling RFID Tags with Visual Confirmation: Clipped Tags are Silenced", IBM Research Report, Aug. 2005.
Campbell, A., "Clippable RFID Tags to Protect Consumers", RFID Weblog, Jan. 2006.

(Continued)

*Primary Examiner* — Jennifer Mehmood
(74) *Attorney, Agent, or Firm* — Patents on Demand, P.A.; Brian K. Buchheit; Scott M. Garrett

(57) ABSTRACT

The present invention discloses a data tag device (100) which initially operates in a passive mode where the tag responds to queries (412). While operating passively, an expiration event occurs (512, 514) which causes the tag to disable a battery (110), preventing subsequent operation in the passive mode, resulting in the tag disabling access to the tag data.

20 Claims, 5 Drawing Sheets

OTHER PUBLICATIONS

Schwartz, E., "IBM Clips RFID's Wings to Shop Private Data's Flight", Computerworld, Nov. 2006.

US Pub. No. 20090303061, Notice of Allowance, Aug. 6, 2010.
US Pub. No. 20090303020, Non-Final Office Action, Jun. 9, 2010.

* cited by examiner

METHOD AND APPARATUS FOR SELF-EXPIRATION OF A PASSIVE DATA TAG DEVICE

BACKGROUND OF THE INVENTION

The present invention relates to the field of data tag devices, and more particularly to passive data tag devices which store time-sensitive data.

Data tag devices are in widespread use and are used to associate information with a particular item, or object. A data tag may be a passive device which can only respond to queries from tag readers, and which receives power to provide the response from the query signal itself. Alternatively a data tag may be an active device, having its own power source allowing it occasionally broadcast an unsolicited beacon signal.

Tags are used in a variety of industries including retail, transportation, medical/healthcare, and security, to name several. They are configured, accordingly, in a variety of form factors, as dictated by the particular application. Tags can be manufactured at such a low cost that they can be considered disposable in many applications. This is especially true of passive data tag devices. However, even though a tag's purpose may have been fulfilled, a conventional tag will persist indefinitely with its data in a retrievable format.

Tags are typically concealed in packing materials, containers, products, and even integrated into these items. When these items are disposed of, the information in the tags may be obtained by third parties. This is particularly true of active tag devices since their beacons signal may be received without any ready query or solicitation. It is anticipated that tag usage will increase.

Retailers can disable tags on items purchased at the point of sale. Disabling these tags adds an additional process at the point of sale, which is typically undesirable since it adds a cost in both equipment and time necessary to deactivate each tag. Furthermore, completely deactivating a tag at a point of sale may be undesirable for other reasons, such as warranty and return tracking, for example.

Another means for deactivating tags is for the consumer to use a so-called RFID zapper, which attempts to overload the circuits of the tag and destroy it as a result. A consumer may also simply destroy a tag to dispose of it. Of course, these methods assume the consumer both knows of the existence of the tag, and that the tag can reasonably be removed from the item with which it is associated. Active data tags, in contrast to passive data tags, contain their own power source, and can therefore maintain a clock in order to self-expire. Conventional passive data tags, however, receive their power from a query signal, and are therefore incapable of maintaining a clock.

Therefore there exists a need for a way to disable passive data tags to reduce the possibility that the tag information will be acquired by unintended parties.

BRIEF SUMMARY OF THE INVENTION

The invention provides in one embodiment a method of initiating self-expiration of a passive data tag. The passive tag device included tag circuitry and has tag data stored in the tag. The method commences by providing a battery which is operably coupled to the tag circuitry, and which is initially in an enabled state. The method further commences by operating the data tag device in a passive mode while the battery is in the enabled state, wherein the data tag device responds to reader queries. Upon detecting the occurrence of an expiration event, the method then commences disabling the battery to a disabled state, which results in disabling access to at least a portion of the tag data.

The invention further provides in another embodiment a passive data tag device. The tag device has tag circuitry which includes a machine readable memory having tag data stored therein, a communication interface configured to facilitate communication of the tag data, and a controller operably coupled to the communication interface and the machine readable memory. The data tag device further includes a battery operably coupled to the tag circuitry, a battery disabling circuit coupled to the battery and responsive to an expiration event. The battery disabling circuit is configured to disable the battery upon occurrence of the expiration event, thereby changing the battery from an enabled state to a disabled state. The controller is configured to operate in a passive mode while the battery is in the enabled state, thereby providing access to the tag data, and further configured to disable access to at least a portion of the tag data when the battery is in the disabled state.

Another embodiment of the invention includes a computer program product on which machine readable code is stored. The machine readable code, upon being executed by a properly configured tag device, causes a data tag device to operate the data tag device in a passive mode, wherein the data tag device provides access to tag data only in response to a query received from a tag reader. It further causes the data tag device to detect an occurrence of an expiration event while operating the data tag device in the active mode. Upon detecting the expiration event, the code causes the tag device to disable a power source of the data tag device, and disable access to at least a portion of the tag data subsequent to disabling the power source.

Another embodiment of the invention provides a method of operating a data tag device, commenced upon receiving a query from a tag reader. The method then commences by checking a state of a battery associated with the tag device, and responding to the query only if the battery is in an enabled state.

DETAILED DESCRIPTION OF THE INVENTION

Figure 1:
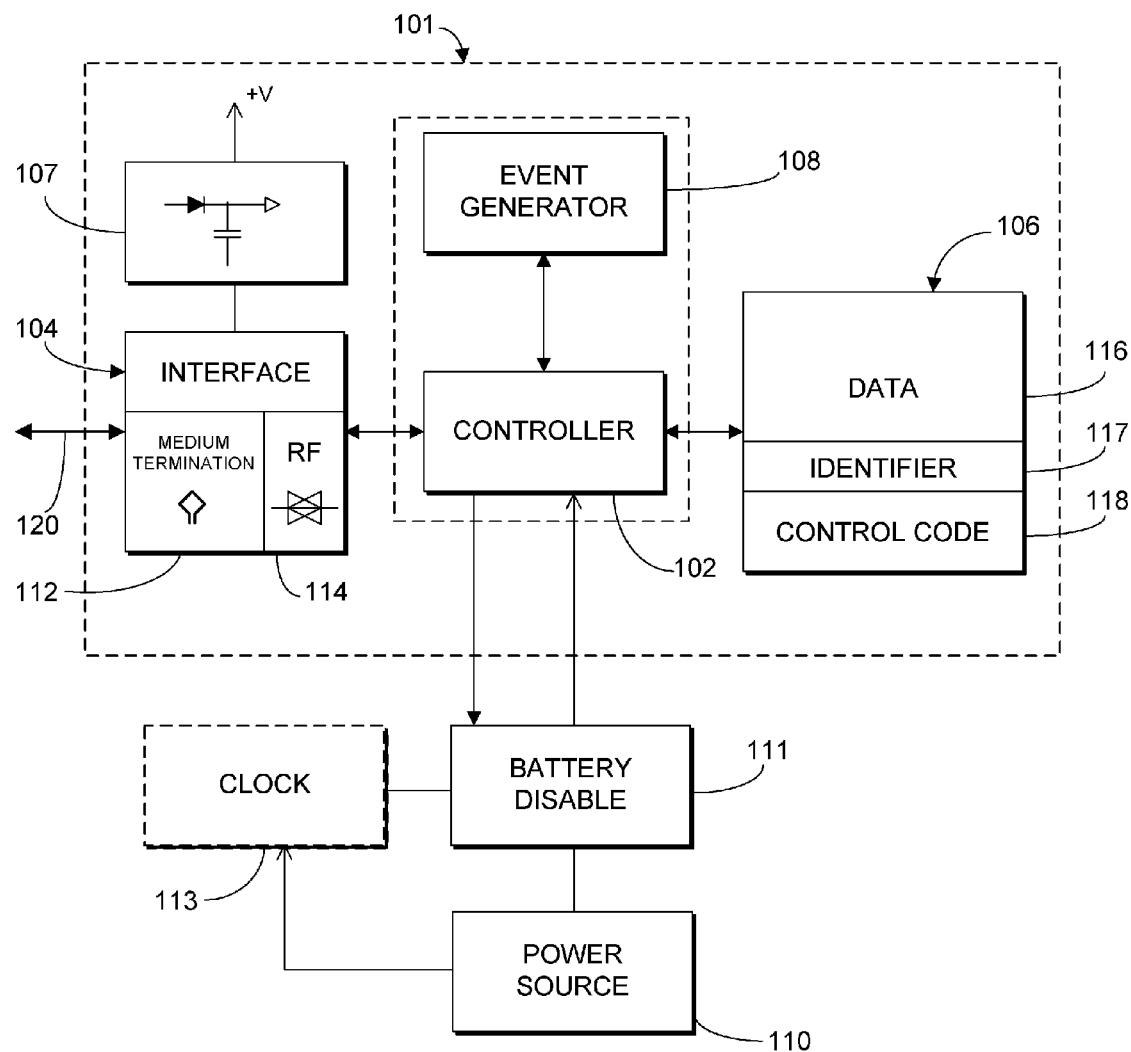
FIG. 1 is a block schematic diagram of an passive data tag device in accordance with an embodiment of the invention.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented at least in part in software, which includes but is not limited to firmware, resident software, microcode, etc.

Furthermore, the invention may be embodied as a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The invention addresses the problem of data persistence in passive data tags by providing a means for self-disabling of the passive data tag. According to the invention, a passive data tag device is provided with a self-powered expiration event generator. Upon occurrence of the expiration event, the power source of the data tag is disabled, thereby preventing subsequent operation in an active mode.

FIG. 1 is a block schematic diagram of a passive data tag device 100 in accordance with an embodiment of the invention. The passive data tag device is used to store data, and physically associate that data with some object. The passive data tag, or simply tag, is typically made to be disposable, and may be permanently or semi-permanently mounted on the object or object packaging. A tag may be removably attached to an object for a temporary association, as well. A passive data tag will transmit in response to a prompting, query, or other solicitation from another device, generally referred to a tag reader. Typically a data tag operating exclusively in a passive mode will not require a power source. Both active and passive data tags respond to a data query received from a tag reader. Passive data tags acquire the necessary power to respond to the query from the querying signal.

The present passive data tag contains tag circuitry 101. Those skilled in the art will appreciate that the grouping of elements shown here, by function, does not necessarily represent how the elements would be grouped physically. The tag circuitry is typically realized on a single integrated circuit chip, and may contain a controller 102, an interface 104, and a memory element 106. Furthermore, as the tag is operated in a passive mode, it must acquire the necessary energy to respond to queries from the querying signal, and will therefore require a charge collection circuit 107. The charge collection circuit may be, for example, and simple rectifier and capacitor circuit to convert the received alternating signal to a steady state voltage at the output of a bulk storage capacitor.

The controller is a computing and logic component which executes instructions or programming designed to carry out the functions of the data tag, such as recognizing received queries and fetching data from the memory, for example. Typically, due to the low level of sophistication needed, the controller need not be on the order of a microprocessor, and may instead use dedicated logic which is responsive to a small number of events. The controller is coupled to an interface element 104 which provides a means of communicating with other devices. The interface element includes a medium termination 112, such as an antenna for wireless communication. Other terminators may be used, such as, for example, an electrical connector, although most tag devices operate wirelessly. A communication circuit 114 is coupled to the termination 112, and converts signals received via the termination to a form usable by the controller 102. Furthermore, the communication circuit receives data signals from the controller and converts them into a form for transmission over the media 120 via the termination 112. In one embodiment of the invention the communication circuit 114 is a radio frequency (RF) transceiver which coverts received radio frequency signals into data signals, and vice-versa, as is known. The charge collection circuit 107 is also coupled to the interface element to receive the alternating voltage signal from received query signals.

The controller is further coupled to a memory element 106, which contains at least a tag data section 116 for storing tag data. The memory element is a machine readable storage medium. The memory element may also contain additional information, such as, for example, a unique tag identifier 117, and control code 118. The control code may include instruction code for operating the controller, as well as operational parameters. Information which may be stored may include an initiation value, an expiration value, or both, to be used by the controller and, in one embodiment of the invention, an event generator 108 in generating an expiration event.

The event generator may be part of the controller, or implemented in code executed by the controller, as indicated by the dashed-line box around both the controller 102 and the event generator 108, or it may be a separate subsystem which is interfaced with the controller. The event generator recognizes a condition of the tag device, or a command received at the tag device, and generates an expiration event. The expiration event is recognized by the controller, which in response commences a expiration process, resulting in the data tag becoming disabled or expired.

To facilitate the expiration process, the passive data tag device further includes a power source or battery 110, which may be, for example, an electrochemical cell or battery element. The power source is operably coupled to the tag circuitry, which may further be coupled to a battery disabling circuit 111. The battery may be used to power the tag circuitry prior to the expiration event, although it is not necessary as the tag device operates in a passive mode, and may acquire power to respond to received queries by other means, such as the charge collection circuit 107. The output of the battery may be provided to an input of the controller so that the controller may determine a state of the battery.

In one embodiment of the invention, the battery disable circuit disables the battery in response to the expiration event. The expiration event may occur at the event generator 108, which may operates as a clock, or it may respond to a separate clock source 113, which is powered by the battery 110 and which may be used directly coupled to the battery disable circuit. The use of a clock allows generation of the expiration event internal to the tag device. It is contemplated that the expiration event may be generated in response to an external source as well, such as, for example, the reception of a "kill" command from an external source, such as a tag reader, which would be processed by the event generator 108. In the case of the tag receiving the kill command the event generator would include the code necessary for recognizing the kill command at the control element. In turn, the control element may provide a disable signal to the battery disable circuit, causing the battery disable circuit to disable the battery. By disabling the battery, the battery is changed from an enabled state to a disabled state. The state of the battery is primarily for indicating whether the tag device is operated in a conventional passive mode, a disabled passive mode where only a portion of tag data may be accessible, or a fully expired mode where the tag device ceases responding to any and all queries.

Figure 2:
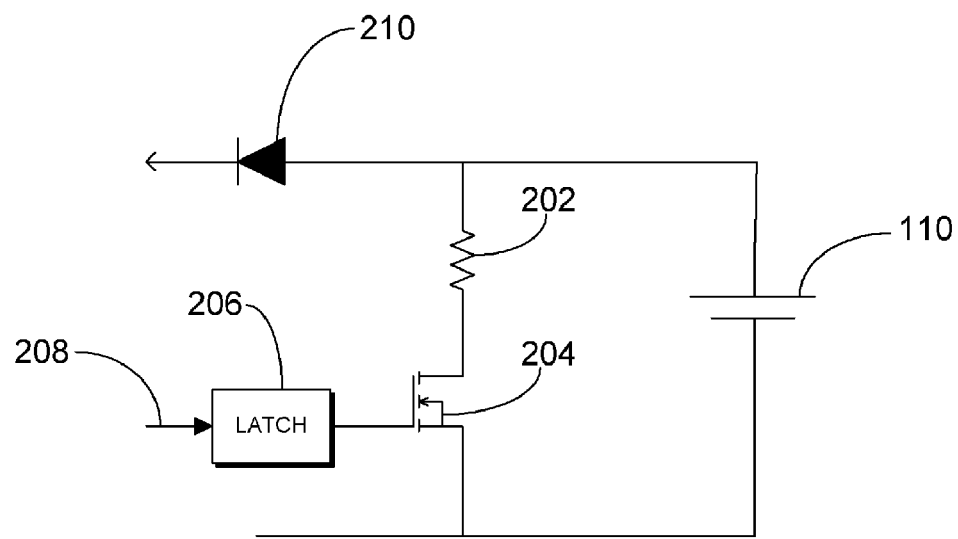
FIG. 2 is a schematic diagram of a battery disabling circuit, in accordance with an embodiment of the invention.
Figure 3:
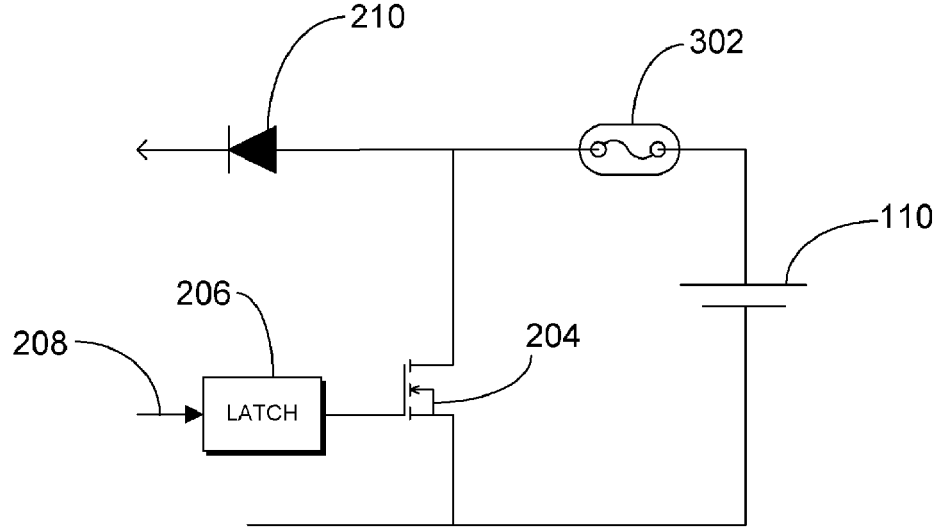
FIG. 3 is a schematic diagram of an alternative battery disabling circuit, in accordance with an embodiment of the invention.

FIGS. 2 and 3 show two exemplary alternative battery disable circuits, in accordance with alternative embodiments of the invention using a battery disable circuit. In FIG. 2, a first battery disable circuit 200 comprises a shunt battery elimination or load circuitry. A resistive load 202 is coupled in series with a switch device 204, such as a transistor. The series load 202 and switch 204 are coupled in parallel with the battery 110. A latch or latching circuit 206 may be used to drive and hold the switch in a closed electrical state in response to receiving an expiration or control signal 208. Initially the switch 204 is electrically open (not conducting). Upon occurrence of the expiration event, the switch 204 changes from a high impedance or open state to a low impedance to closed state, allowing conduction of current from the battery through the load 202, thereby dissipating the energy stored in the battery. The choice of load resistance value, in ohms, depends on the particular application. As the battery charge is being depleted, it is converted to heat in the load 202. Accordingly, adequate provisions should be made to deal with the resulting heat. The use of a shunt load to eliminate or dissipate battery charge is one means of draining the battery. As mentioned, another means would be, for example, undertaking some power-intensive operation, such as, for example, transmitting a signal from the interface. The signal would preferably be a non-interfering signal and should comply with applicable governmental regulations. A reverse current protection device, such as a diode 210, may be desirable in embodiments of the invention where the battery is used to initially power the tag circuitry to prevent damaging or shorting of the circuitry upon disabling the battery.

FIG. 3 shows a schematic diagram 300 of a battery disconnect circuit, as one alternative to a shunt load charge elimination circuit. Rather than using a parallel load, a fuse or fusible link 302 is provided between the battery and the tag circuitry. Upon occurrence of the expiration event, the switch 204 is closed, drawing a high current pulse through the fuse 302, causing it to open, thereby disabling the battery. The fuse may be replaceable, allowing re-use of the tag as an active tag once the fuse is replaced. If a fusible link is used, it may be designed by narrowing a section of conductive runner in a circuit layout sufficiently such that it is burned out when the switch is closed.

Figure 4:
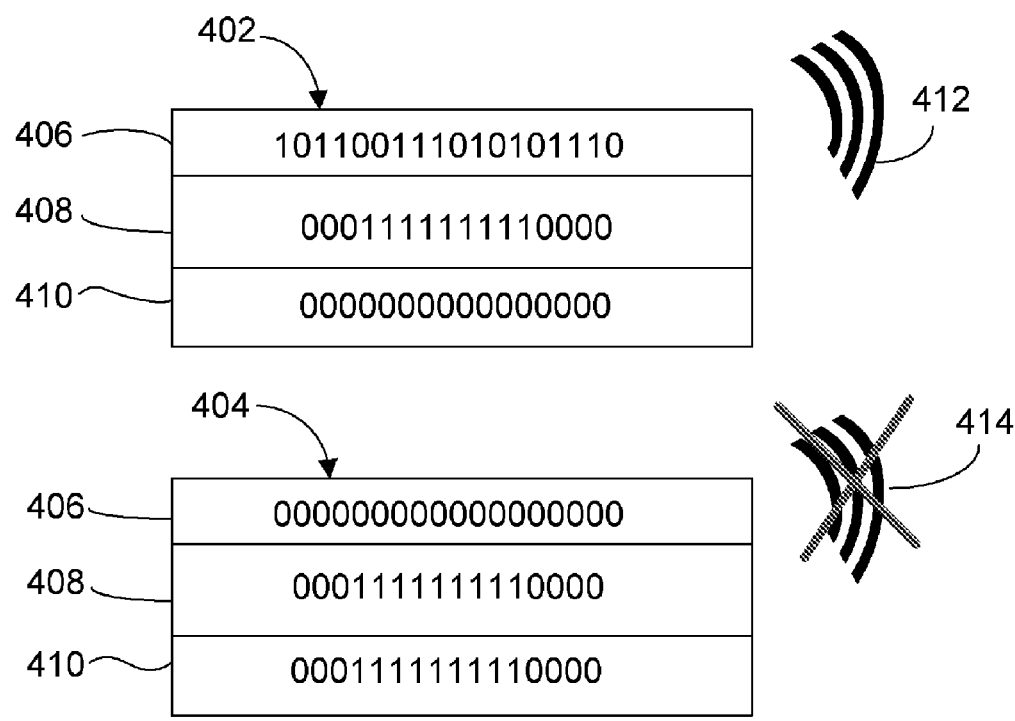
FIG. 4 is a diagram of a counter for generating an expiration event in a data tag, in accordance with an embodiment of the invention.

According to the invention, the battery is to be disabled upon the occurrence of an expiration event. In one embodiment of the invention it is contemplated that a clock circuit or equivalent may be used to measure a period of time in which the tag is to operate in the passive mode, and upon expiration of the desired period of time, the tag ceases passive operation, and may operate in a disabled passive mode, or an expired mode. FIG. 4 shows a counter diagram 400 for generating an expiration event in a data tag, in accordance with an embodiment of the invention. The counter discussed may be the clock 113, or the expiration event generator 108 may be configured as a clock if the battery supplies power to the tag circuitry while the tag device operates in the passive mode. The diagram shows tag data 406, which is stored in a memory of the tag. The tag data is not part of the counter or clock, but is shown to illustrate how, in one embodiment of the invention, some or all of the tag data may be erased or otherwise made inaccessible. The clock uses an expiration value 408 to compare with a clock value 410. In the embodiment presented in FIG. 4, the clock comprises a count-up counter. The counter starts counting from an initial value, such as zero, to the expiration value 408. Either the initial value, expiration value, or the clock rate, or any combination thereof maybe used to control the duration of the passive mode of the tag. Prior to the clock value reaching the expiration value the tag operates in a passive mode and will respond to received queries, as indicate by response burst 412. The clock value reaching the expiration value constitutes an expiration event, and the tag will subsequently cease functioning in the passive mode, and will thereafter respond with only a portion of the tag data, or cease responding completely, as indicated at 414. It is contemplated in one embodiment of the invention that the tag data 406 may be partially or completely wiped or erased, upon the occurrence of the expiration event, as indicated in field 406 in the "after" diagram 404. It will be appreciated by those skilled in the art that a variety of clock circuits may be used, including simple counters as shown here, as well as more complex time of day clocks which maintain the time of day, and possibly date as well, as the clock value. When a time of day clock is used the specific expiration time and date may be set or programmed by setting the expiration value to a date and time.

Figure 5:
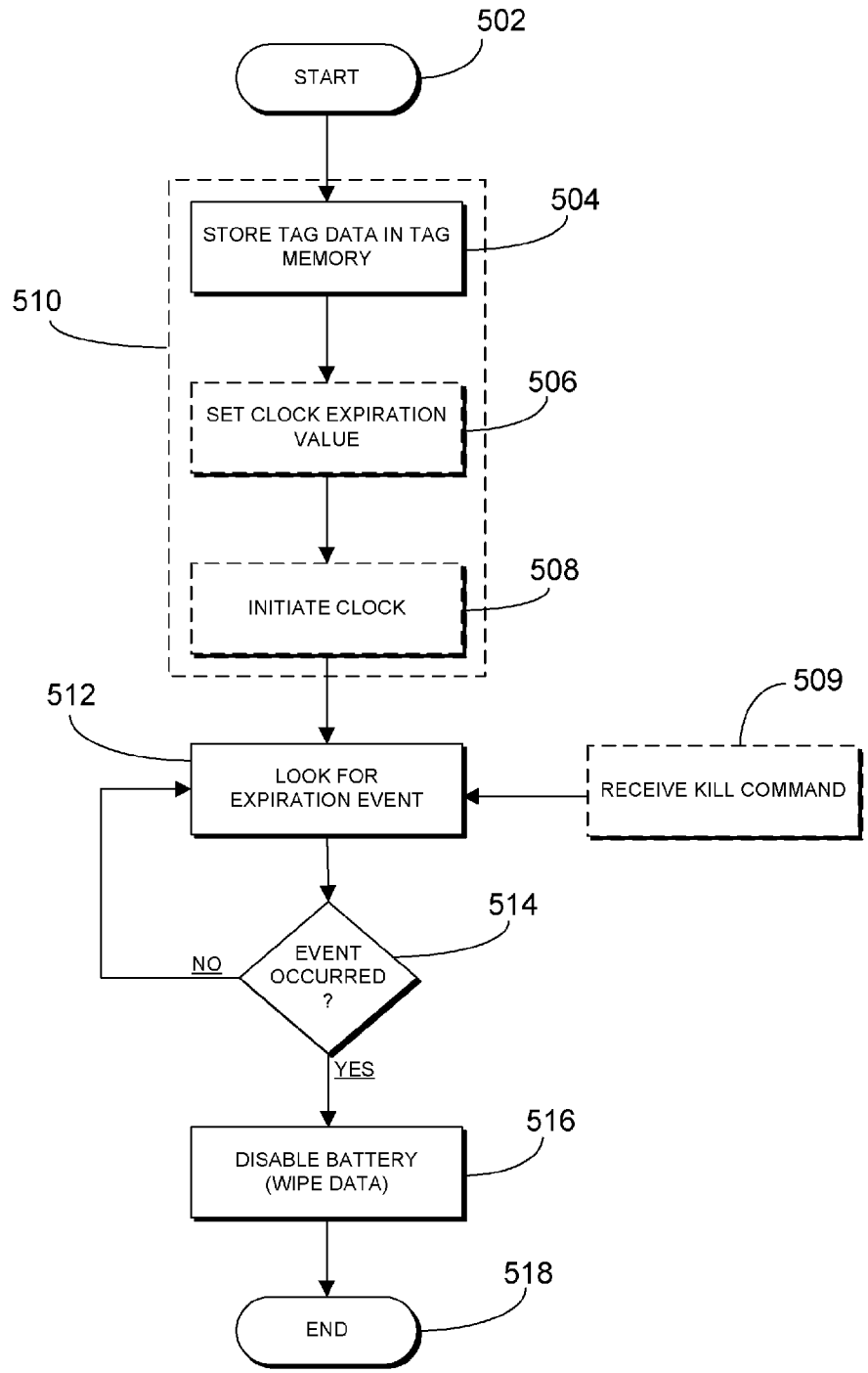
FIG. 5 is a flow chart diagram of a method of disabling a data tag, in accordance with an embodiment of the invention.

FIG. 5. shows a flow chart diagram 500 of a method of initiating self-expiration of a passive data tag, in accordance with an embodiment of the invention. At the start 502, the tag is ready for operation, but not yet programmed and operating. Therefore, the tag must be initiated. Initiating the tag may include storing tag data in the tag memory (504). Similarly, an expiration value may be set (506) in the clock, along with any additional expiration parameters. When the tag is ready for use, in an embodiment using a clock, the clock is started or otherwise initiated (508). The tag initiation process 510 may include steps 504, 506, and 508 which may be done at the same time, or at different times. For example, the event generator maybe initiated at the time of manufacture, or it may be initiated at the time of sale of an item with which the tag is associated. Similarly, tag data and the expiration value may be stored at various times.

Once the tag is initialized, the tag may then, among other processes it may perform, continue checking for an expiration event (512, 514). For example, the tag may compare a present clock value with an expiration value. The comparison may be a performed, for example, by the controller, or it may be performed by logic gates, or any other suitable means of comparing. While the clock value has not reached the expiration value, the process keeps repeating. In embodiments using a clock source to determine the expiration time, the battery power may be used to power a clock in the tag circuitry, or a separate clock may be used which is directly coupled to a battery disabling circuit. Alternatively or in addition to the clock, the tag may check to see if a kill command has been received (509). Once the requisite expiration event has occurred, the battery is disabled (516) by the selected means, and the method then terminates (518). In addition to disabling the battery, the tag may also erase or wipe some or all of the tag data. Subsequent to the expiration event, however, the tag may continue operating in a passive mode, and allow access to the tag data in response to appropriate queries. While operating in the passive mode, access to at least a portion of the tag data may be disabled.

Figure 6:
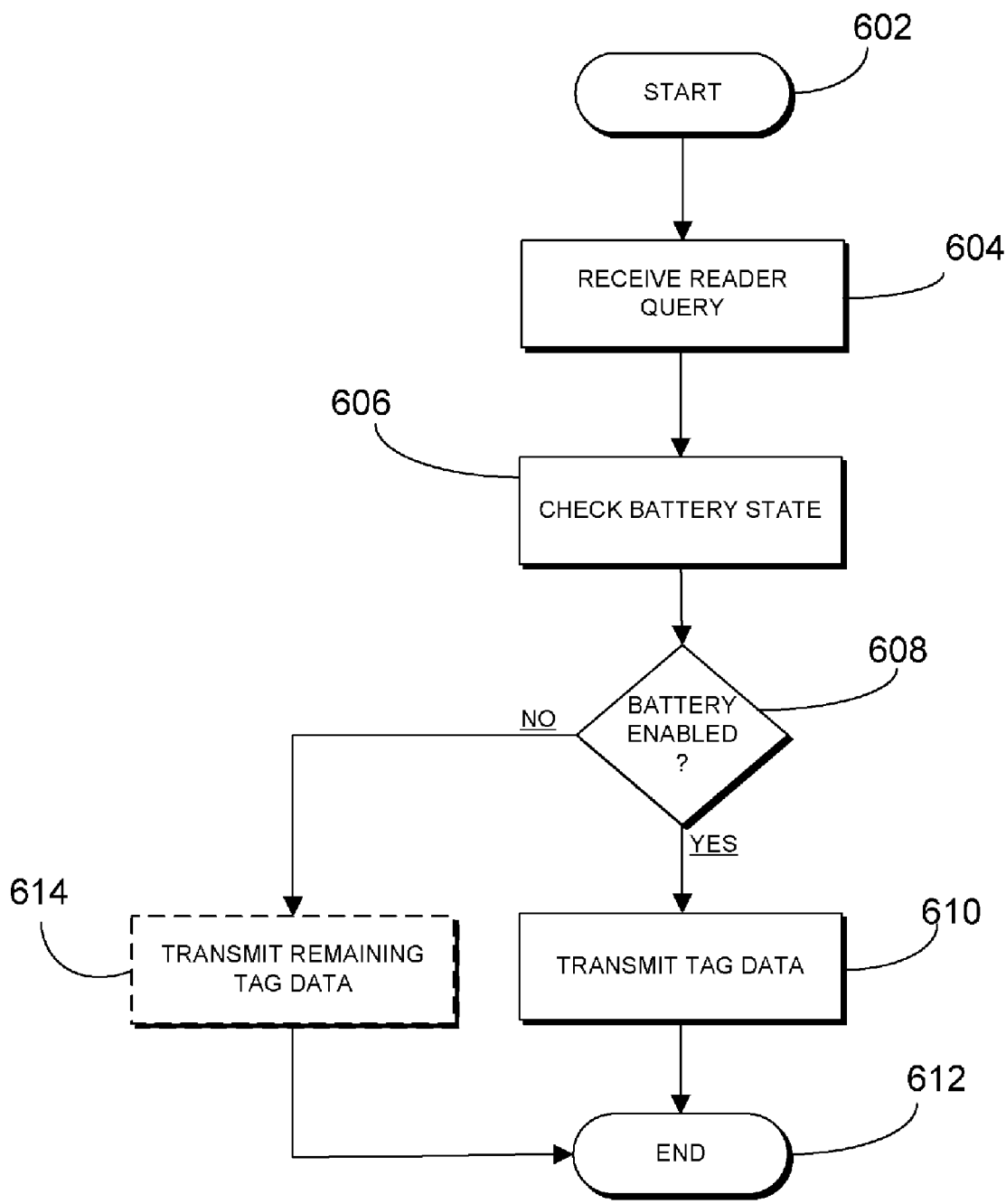
FIG. 6 shows flow chart diagram of a method of operating a data tag device, in accordance with an embodiment of the invention.

FIG. 6 shows flow chart diagram 600 of a method of operating a data tag device, in accordance with an embodiment of the invention. At the start 602 of the present method, the tag device may be deployed and in use, or expired. Upon an attempt to read the tag data, the tag receives a reader query (604). Upon receiving the query, the tag device checks the state of the battery (606, 608). If the battery is in the enabled state, the tag will commence responding by transmitting the tag data (610). If the battery is in the disabled state, the tag device will either not respond, or it may respond with a portion of the tag data (614) that has not been erased, or which may otherwise be available for a response subsequent to the battery being disabled.

Those skilled in the art will realize that the invention may be implemented in the form of a computer program product. Machine readable code stored on the computer program product will cause a data tag device to operate the data tag device in an active mode. While in the active mode, the data tag device occasionally transmits a beacon and provides access to tag data. The code will cause the tag to detect the occurrence of an expiration event while operating the data tag device in the active mode, and disable the power source upon detecting the expiration. Once the power source is disabled, the data tag device is prevented from subsequent active mode operation.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of initiating self-expiration of a passive data tag device, the passive data tag device including tag circuitry and having tag data stored therein, the method comprising:
   providing a battery operably coupled to a battery disable circuit and initially in an enabled state;
   operating the passive data tag device in a passive mode while the battery is in the enabled state wherein the passive data tag device responds to reader queries in the passive mode with energy acquired from the queries;
   detecting an occurrence of an expiration event while operating in the passive mode;
   disabling the battery to a disabled state responsive to detecting the expiration event and while operating in the passive mode;

disabling access to at least a portion of the tag data responsive to disabling the battery and while operating in the passive mode.

2. The method of claim 1, wherein detecting the occurrence of the expiration event comprises receiving a kill command from an external source.

3. The method of claim 1, wherein detecting the occurrence of the expiration event comprises detecting a clock in the passive data tag device reaching an expiration value.

4. The method of claim 3, wherein the clock is a counter.

5. The method of claim 3, wherein the clock is a time of day clock.

6. The method of claim 1, wherein disabling the battery comprises draining the battery.

7. The method of claim 6, wherein draining the battery comprises connecting a shunt load in parallel with the battery.

8. The method of claim 6, wherein disabling the battery comprises disabling an electrical connection between the battery and at least a portion of circuitry of the passive data tag device.

9. The method of claim 8, wherein disabling the electrical connection comprises overloading a fusible link between the battery and the portion of circuitry.

10. The method of claim 1, wherein disabling access to the portion of tag data comprises receiving reader queries, determining that the battery is in a disabled state, and not responding to the reader queries responsive to determining that the battery is in the disable state.

11. The method of claim 1, wherein disabling access to at least a portion of tag data comprises erasing the portion of tag data while leaving some tag data remaining, the method further comprising:
    receiving a query subsequent to erasing the portion of the tag data; and
    responding to the query with the remaining tag data.

12. A passive data tag device, comprising:
    tag circuitry including:
        a machine readable memory having tag data stored therein;
        a communication interface configured to facilitate communication of the tag data;
        a controller operably coupled to the communication interface and the machine readable memory;
    a battery; and
    a battery disabling circuit coupled to the battery and responsive to an expiration event while the passive data tag device operates in a passive mode, the battery disabling circuit configured to disable the battery upon occurrence of the expiration event thereby changing the battery from an enabled state to a disabled state;
    wherein the tag circuitry operates in a passive mode both while the battery is in the enabled state and the disabled state, the tag circuitry allowing access to the tag data when the battery is in the enabled state, and disabling access to at least a portion of the tag data when the battery is in the disabled state.

13. A passive data tag device as defined in claim 12, wherein the battery disabling circuit comprises a shunt battery elimination circuit configured to deplete the battery of charge upon occurrence of the expiration event.

14. A passive data tag device as defined in claim 12, wherein the battery disabling circuit comprises a disconnect circuit configured to disconnect the battery from the tag circuitry upon occurrence of the expiration event.

15. A passive data tag device as defined in claim 12, further comprising a clock circuit configured to maintain a clock value with time, wherein the expiration event occurs upon the clock value reaching a termination value.

16. A passive data tag device as defined in claim 12, wherein the controller is further configured to generate the expiration event upon the passive data tag device receiving a kill command from an external source, the kill command being received by the communication interface from the external source.

17. A data tag device as defined in claim 12, wherein the controller is configured to disable access to at least a portion of the tag data when the battery is in the disabled state by erasing the portion of tag data upon the occurrence of the expiration event, and leaving some of the tag data remaining, wherein subsequent to erasing the portion of the tag data the passive data tag device responds to queries with the remaining tag data.

18. A computer program product having machine readable code stored thereon, the machine readable code causing a passive data tag device including a power source to:
    operate the passive data tag device in a passive mode when the power source is in an enabled state wherein the passive data tag device provides access to tag data only in response to a query received via a query signal from a tag reader and wherein the passive data tag device responds to the query with energy acquired from the query signal;
    detect an occurrence of an expiration event while operating the data tag device in the passive mode;
    disable the power source of the passive data tag device upon detecting the expiration event;
    disable access to at least a portion of the tag data responsive to disabling the power source; and
    operate the passive data tag device in one of either a disabled passive mode or a fully disabled mode responsive to disabling the power source.

19. A computer program product as defined in claim 18, wherein disabling access to the portion of tag data comprises ceasing to respond to queries.

20. A method of operating a passive data tag device with tag data stored in the passive data tag device, comprising:
    while operating the passive data tag device in a passive mode:
    receiving a query from a tag reader via a query signal;
    checking a state of a battery associated with the passive data tag device responsive to receiving the query;
    responding to the query with all the tag data only if the battery is in an enabled state; and
    when the battery is in a disabled state either responding to the query with tag data that is less than all of the tag data, or not responding to the query;
    wherein responding to the query is performed with energy acquired from the query signal.

* * * * *